United States Patent
Park

(10) Patent No.: US 10,267,471 B2
(45) Date of Patent: Apr. 23, 2019

(54) LIGHTING DEVICE FOR VEHICLE WITH LENS WITH REFLECTING UNIT

(71) Applicant: LG ELECTRONICS INC., Seoul (KR)

(72) Inventor: Jun Park, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 15/468,792

(22) Filed: Mar. 24, 2017

(65) Prior Publication Data
US 2017/0293052 A1 Oct. 12, 2017

Related U.S. Application Data

(60) Provisional application No. 62/314,544, filed on Mar. 29, 2016.

(30) Foreign Application Priority Data

Jun. 1, 2016 (KR) .......................... 10-2016-0068207

(51) Int. Cl.
*F21S 41/143* (2018.01)
*F21S 41/275* (2018.01)
(Continued)

(52) U.S. Cl.
CPC .............. *F21S 41/143* (2018.01); *B60Q 1/04* (2013.01); *F21S 41/16* (2018.01); *F21S 41/25* (2018.01); *F21S 41/275* (2018.01); *F21S 41/36* (2018.01); *F21S 41/39* (2018.01); *F21S 43/00* (2018.01); *F21V 7/05* (2013.01); *G02B 3/0037* (2013.01); *F21S 41/365* (2018.01); *G02B 2003/0093* (2013.01); *G02B 2207/113* (2013.01)

(58) Field of Classification Search
CPC .......... F21S 41/14; F21S 41/16; F21S 41/255; F21S 48/1145; F21S 48/115;
(Continued)

(56) References Cited

U.S. PATENT DOCUMENTS

2011/0216550 A1* 9/2011 Koike ..................... F21S 41/16
362/519
2015/0062943 A1* 3/2015 Takahira .............. B60Q 1/0023
362/510
(Continued)

FOREIGN PATENT DOCUMENTS

CN 103969934 A * 8/2014 .......... F21V 29/2212
DE 102014217521 3/2016
(Continued)

OTHER PUBLICATIONS

Machine translation of CN 103969934A, retrieved Apr. 4, 2018 from espacenet.*

(Continued)

*Primary Examiner* — Anh T Mai
*Assistant Examiner* — Steven Y Horikoshi
(74) *Attorney, Agent, or Firm* — Fish & Richardson P.C.

(57) ABSTRACT

A lighting device for a vehicle may include a light source and a first reflecting unit configured to reflect a beam emitted from the light source. The lighting device may also include a lens in which the first reflecting unit is provided on a partial area of a surface of the lens. The lighting device may also include a reflective fluorescent body configured to convert a wavelength of light reflected from the first reflecting unit; and reflect, into the lens, the wavelength-converted light reflected from the first reflecting unit. The reflective fluorescent body may be disposed on a rear side of the lens and faces a rear surface of the lens. The first reflecting unit may be disposed so as not to be linearly aligned with the light source and the reflective fluorescent body.

18 Claims, 6 Drawing Sheets

(51) Int. Cl.
*F21S 41/25* (2018.01)
*F21S 41/39* (2018.01)
*F21S 41/36* (2018.01)
*F21S 43/00* (2018.01)
*B60Q 1/04* (2006.01)
*F21V 7/05* (2006.01)
*G02B 3/00* (2006.01)
*F21S 41/16* (2018.01)
*F21S 41/365* (2018.01)

(58) Field of Classification Search
CPC ....... F21S 48/1154; F21S 48/125; F21K 9/64; G03B 21/2013; G03B 21/2033; G03B 21/204; G03B 21/2066; H01L 3/5073; B60Q 11/00; B60Q 11/005
See application file for complete search history.

(56) References Cited

U.S. PATENT DOCUMENTS

2015/0357790 A1* 12/2015 Jeoung ...................... F21V 5/04 372/32
2015/0375672 A1    12/2015 Takahashi
2016/0238209 A1*  8/2016 Kimura .................. F21S 41/24

FOREIGN PATENT DOCUMENTS

| EP | 3086022 | 10/2016 | |
|----|---------|---------|---|
| JP | 2004-085725 | 3/2004 | |
| JP | 2014-178464 | 9/2014 | |
| JP | 2015-064963 | 4/2015 | |
| KR | 10-2008-0082345 | 9/2008 | |
| KR | 10-2011-0022720 | 3/2011 | |
| WO | 2014/121707 | 8/2014 | |
| WO | WO 2014163269 A1 * | 10/2014 | ................ F21V 5/04 |

OTHER PUBLICATIONS

Machine of translation CN 103969934 A.*
Notice of Allowance in Korean Application No. 10-2016-0068207, dated Sep. 11, 2017, 7 pages (with English translation).
Office Action in Korean Application No. 10-2016-0068207, dated Apr. 28, 2017, 10 pages (with English translation).
Extended European Search Report in European , Application No. 17162301.0 dated Sep. 7, 2017, 7 pages.

* cited by examiner

LIGHTING DEVICE FOR VEHICLE WITH LENS WITH REFLECTING UNIT

CROSS-REFERENCE TO RELATED APPLICATIONS

The present application claims an earlier filing date and right of priority under 35 U.S.C. 119 and 35 U.S.C. 365 to U.S. provisional patent application No. 62/314,544 (filed on Mar. 29, 2016) and Korean Patent Application No. 10-2016-0068207 (filed on Jun. 1, 2016), the contents of which are hereby incorporated by reference in their entirety.

TECHNICAL FIELD

The present disclosure relates to a lighting device for a vehicle.

BACKGROUND

A vehicle typically implements a lighting device such as a lamp which causes a driver to secure visibility or can inform the driver of the outside of the current running state of the vehicle by increasing intensity of the illumination of the vehicle surroundings.

A lighting device for a vehicle installed in the vehicle may include a head lamp which irradiates light to the front of the vehicle. A lighting device may also include a rear lamp which displays the heading direction of the vehicle, indicates whether or not the brake operation, or the like at the rear of the vehicle.

The lighting device for a vehicle may form various light intensities, such as a low beam or a high beam for securing visibility of a driver at the time of night driving. Recently, use of a light emission diode (LED) which has a high power efficiency and a long service life is gradually increased. In addition, it is possible to use a laser diode having a long irradiation distance.

SUMMARY

Systems and techniques are disclosed that provide a lighting device for a vehicle.

In one aspect, a lighting device for a vehicle may include a light source and a first reflecting unit. The first reflecting unit may be configured to reflect a beam emitted from the light source. The lighting device may also include a lens in which the first reflecting unit is provided on a partial area of a surface of the lens. The lighting device may further include a reflective fluorescent body configured to: convert a wavelength of light reflected from the first reflecting unit; and reflect, into the lens, the wavelength-converted light reflected from the first reflecting unit. The reflective fluorescent body may be disposed on a rear side of the lens and faces a rear surface of the lens. The first reflecting unit may be disposed so as not to be linearly aligned with the light source and the reflective fluorescent body.

In some implementations, the rear surface of the lens may have a concave shape and a front surface of the lens may have a convex shape.

In some implementations, the first reflecting unit may be provided in the rear surface of the lens and the rear surface of the lens may be an aspheric surface.

In some implementations, the first reflecting unit may be provided in the front surface of the lens.

In some implementations, the rear surface of the lens may be a spherical surface.

In some implementations, a curvature of the rear surface of the lens may be less than a curvature of the front surface of the lens.

In some implementations, a curvature of the rear surface of the lens may be a curvature through which the light reflected from the first reflecting unit is transmitted.

In some implementations, a cross sectional shape of the first reflecting unit may be an arc shape.

In some implementations, the first reflecting unit may be a concave mirror which is formed in the surface of the lens.

In some implementations, the light source may be configured to emit the light beam in a direction parallel to an optical axis of the lens.

In some implementations, the reflective fluorescent body may be disposed on an optical axis of the lens.

In some implementations, the light source may be disposed so as not to intersect with an optical axis of the lens.

In some implementations, the reflective fluorescent body may include a reflecting unit configured to reflect light and may also include a wavelength conversion layer configured to convert a wavelength of light.

In some implementations, the reflective fluorescent body may further include a heat radiating member configured to dissipate heat.

In some implementations, the lighting device may further include a second reflecting unit provided in the surface of the lens and configured to reflect, to a rear side of the lens, light that is reflected from the reflective fluorescent body.

In some implementations, the rear surface of the lens may have a flat surface and a front surface of the lens may have a convex shape. The first reflecting unit may be provided in the front surface of the lens.

In some implementations, the lighting device may further include at least one projection lens disposed on a front side of the lens and configured to condense the light emitted from a front surface of the lens.

In some implementations, an optical axis of the at least one projection lens may match the optical axis of the lens.

In some implementations, the first reflecting unit being disposed so as not to be linearly aligned with the light source and the reflective fluorescent body may include: the first reflecting unit being disposed so as not to intersect with an extension line connecting the light source and the reflective fluorescent body.

In some implementations, the first reflecting unit being disposed so as not to be linearly aligned with the light source and the reflective fluorescent body may include: the first reflecting unit being disposed such that the beam emitted from the light source reaches the first reflective unit without being blocked by the reflective fluorescent body.

DETAILED DESCRIPTION

Systems and techniques are disclosed that provide a lighting device, such as those for a vehicle, that implements one or more reflecting units on a surface of a lens of the lighting device. The one or more reflecting units are configured on the surface of the lens so as to interoperate with a reflective fluorescent body of the lighting device to redirect light beams within the lighting device.

In some implementations, the lighting device for a vehicle implements an additional optical component, such as one or more reflecting units, that reflect light beams to be incident upon the reflective fluorescent body. The additional optical component may be configured so as not to be disposed spaced apart from the lens, but instead may be configured on the surface of the lens itself.

Accordingly, the additional optical components may be easily disposed and number of the separate components may be minimized. As such, the lighting device for a vehicle may be more compact by the one or more reflecting units being provided in a partial area of the surface of the lens.

The one or more reflecting units can, in some implementations, improve safety, performance, and manufacturing convenience of the lighting device for the vehicle. For example, in some implementations, the lighting device for a vehicle described herein may reduce the number of components and simplify manufacturing, providing a more compact structure.

Figure 1:
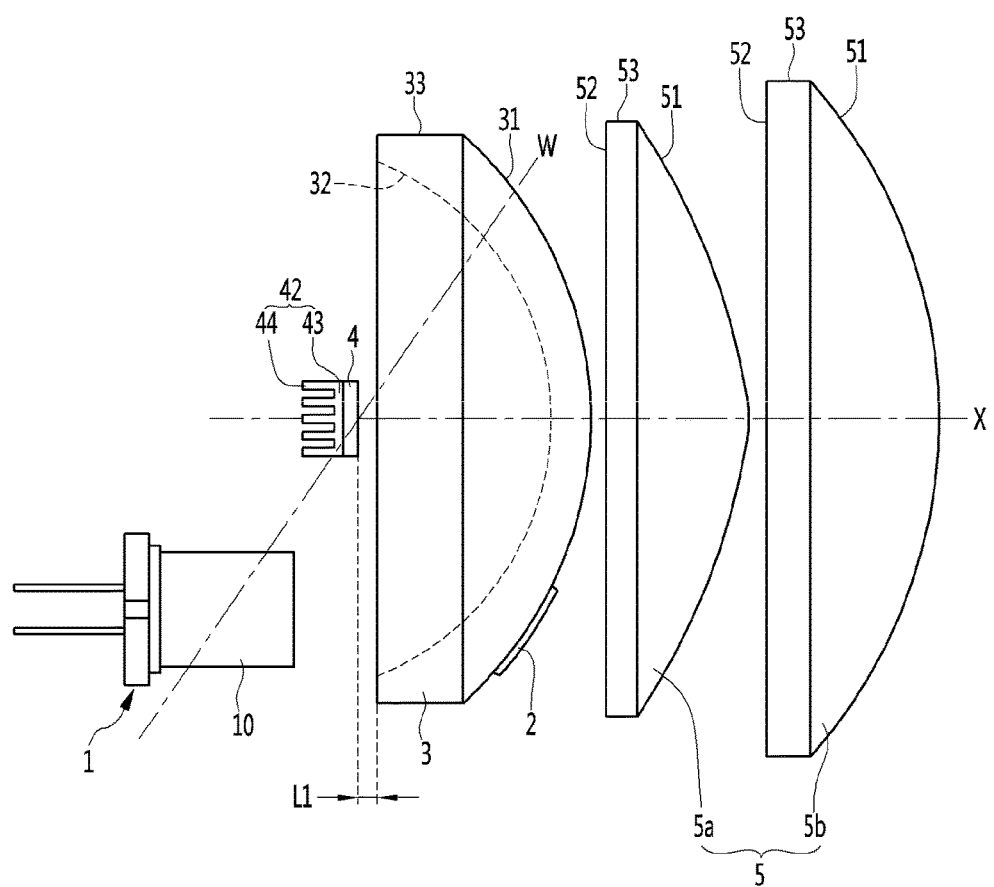
FIG. 1 is a diagram illustrating an example of a lighting device for a vehicle according to a first implementation.
Figure 2:
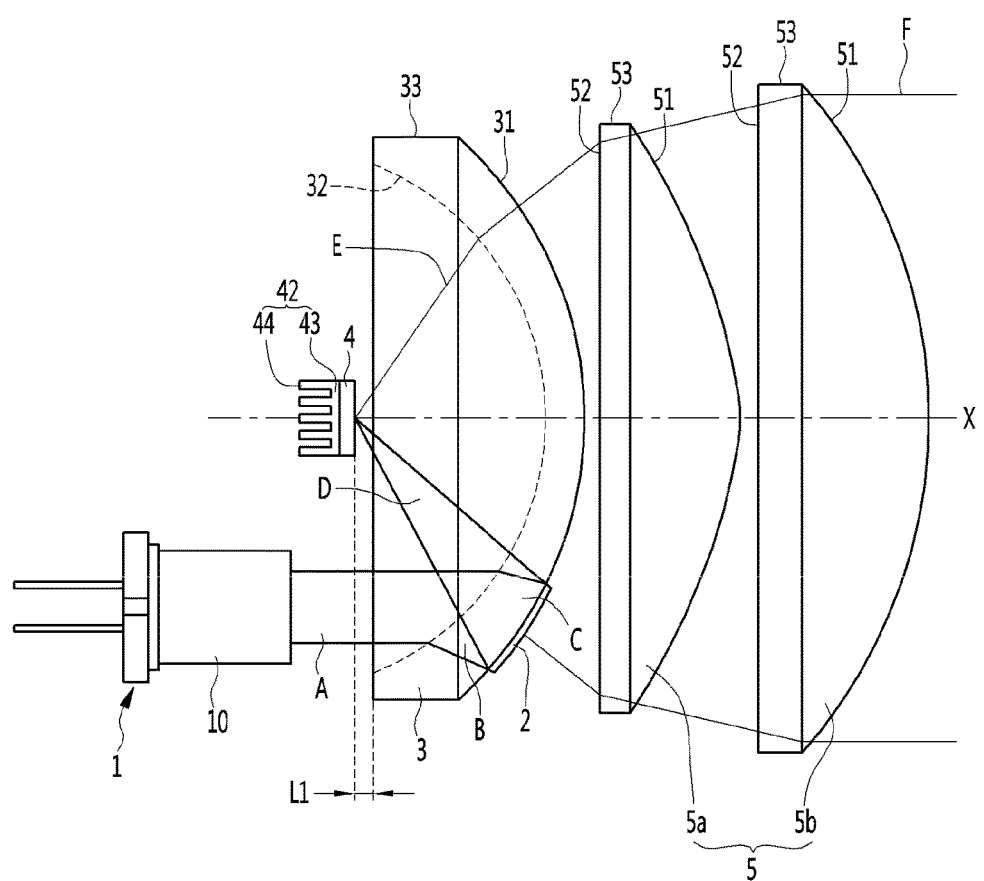
FIG. 2 is a diagram illustrating an example of an optical path of the lighting device for a vehicle according to the first implementation.
Figure 3:
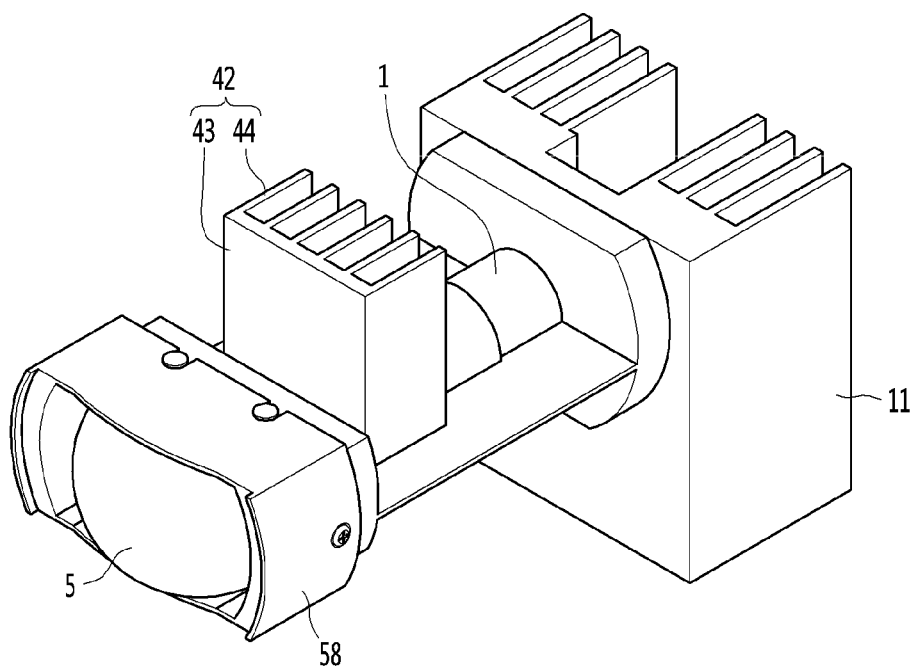
FIG. 3 is a diagram of a perspective view illustrating an example of the lighting device for a vehicle according to the first implementation.

FIG. 1 is a construction view illustrating a lighting device for a vehicle according to a first implementation, FIG. 2 is a construction view illustrating an optical path of the lighting device for a vehicle according to the first implementation, and FIG. 3 is a perspective view illustrating the lighting device for a vehicle according to the first implementation.

The lighting device for a vehicle may include a lighting device 1 having a light source 10, a first reflecting unit 2, a lens 3, and a reflective fluorescent body 4.

The lighting device for a vehicle may constitute a head lamp for a vehicle. The lighting device for a vehicle may be used as a high beam lighting device which generates a high beam or may be used as a low beam lighting device which generates a low beam.

According to an implementation, the lighting device 1 may emit a beam, such as a light beam, to the first reflecting unit 2. The lighting device 1 may be configured to emit a beam toward the lens 3 and the beam emitted toward the lens 3 transmits through the lens 3 and may be incident on the first reflecting unit 2.

The lighting device 1 is configured to emit a beam toward a rear surface of the lens 3, and the beam which is incident on the rear surface of lens 3 from lighting device 1 transmits through lens 3 and is incident on the first reflecting unit 2.

The lighting device 1 may include the light source 10. The light source 10 receives electric energy and may convert the received electric energy into light energy. The light source 10 may be, for example, a light emitting source such as an ultra-high pressure mercury lamp (UHV Lamp), a light emission diode (LED), or a laser diode.

A light source 10 preferably is a light source configured to irradiate light from a long distance while having features of straightness and high efficiency. In some implementations, the light source preferably is a laser diode. The laser diode as a light source preferably is a laser diode which irradiates with a blue based laser beam having high efficiency.

In some implementations, a heat radiating member 11 which radiates heat generated in the light source 10 is connected to the light source 10, as illustrated in FIG. 3. The heat radiating member 11 may include a contact plate which is in contact with the light source 10 and a heat radiating pin which is projected from the contact plate.

The lighting device 1 may further include a reducer which allows the diameter of the beam emitted from the light source 10 to be reduced and emits the beam toward the first reflecting unit 2, a reflecting member which changes an optical path of the beam emitted from the light source 10, or the like.

In a case where the lighting device 1 includes both the light source 10 and the reducer, the beam emitted from the light source 10 may be emitted toward the first reflecting unit 2 after passing through the reducer. In a case where the lighting device 1 includes the light source 10 and does not include the reducer, the beam emitted from the light source 10 is configured to being incident on the first reflecting unit 2.

In a case where the lighting device 1 includes both the light source 10 and the reducer, the beam emitted from the light source 10 is configured to be incident on the first reflecting unit 2 after the optical path is changed at the reflecting unit. In a case where the lighting device 1 includes the light source 10 and does not include the reflecting member, the beam emitted from the light source 10 is capable to being incident on the first reflecting unit 2.

Hereinafter, a case where the lighting device 1 includes the light source 10 and does not include the reducer and the reflecting member will be described. However, the scope of the present disclosure is not limited to this.

The lens 3 may have a greater size than the sizes of the reflective fluorescent body 4 and the first reflecting unit 2. The reflective fluorescent body 4 and the first reflecting unit 2 are capable of being protected at the front side of the reflective fluorescent body 4.

The lens 3 may include a front surface 31 and a rear surface 32. The lens 3 may further include a perimeter surface 33 according to a shape of the lens 3. The front side of the lens 3 can mean the front side of the front surface 31 of the lens and the rear side of the lens 3 can mean the rear side of the rear surface 32 of the lens.

The lens 3 may be a meniscus lens of which the front surface 31 and the rear surface 32 have curvatures in the same directions with each other.

The lens 3 may include a front surface (31) having a convex shape and a rear surface 32 having a concave shape. More specifically, the front surface 31 of the lens 3 may have a convex curved surface toward the front side and the rear surface 32 of the lens 3 may have having a recessed curved surface toward the front side. The inner area of the recessed curved surface which is the rear surface 32 of the lens 3 may means the rear side of the lens 3.

In a case where the rear surface 32 of the lens 3 is a recessed curved surface, that is, a concave curved surface other than a flat surface, an incident angle at which the beam reflected from the first reflecting unit 2 is incident on the rear surface 32 of the lens 3 may be decreased. Accordingly, an optical loss by reflection generated at the rear surface 32 of the lens 3 is reduced. In addition, the incident angle of beam which is reflected from the first reflecting unit 2 and passes through the rear surface 32 of the lens 3 to the reflective fluorescent body 4 is decreased and thus the optical efficiency is increased.

The front surface 31 and/or the rear surface 32 of the lens 3 may be an aspheric surface.

The rear surface 32 of the lens 3 may be a spherical surface having the same curvature in all the portions of the rear surface 32. The spherical surface has an advantages that manufacture thereof may be easy, the cost of the manufacture thereof may be low and the sensitivity to the point at which the beam reaches the lens 3 may be improved, compared to the aspheric surface.

The curvature of the rear surface 32 of the lens 3 may be smaller than the curvature of the front surface 31 in order to condense the white based light emit from the reflective fluorescent body 4.

The curvature of the rear surface 32 of the lens 3 may be a curvature that the beam reflected from the first reflecting unit 2 transmits through the rear surface 32 of the lens 3.

In a case where the first reflecting unit 2 is provided on the front surface 31 of the lens 3, the beam reflected from the first reflecting unit 2 transmits through the rear surface 32 of the lens 3 and then reaches the reflective fluorescent body 4. A portion of the beam reflected from the first reflecting unit 2 is not transmitted through the rear surface 32 of the lens 3 but may be reflected from the rear surface 32 of the lens 3.

In this case, the optical loss may be generated. Further, there are concerns that the eyes of the human suffer injury or the eyesight of the human is damaged by the blue based beam of which the wavelength is not converted at the reflective fluorescent body 4 being capable of being emitted to the front side of the lighting device for a vehicle.

Accordingly, it is preferable that the curvature of the rear surface 32 of the lens 3 is a curvature through which the beam reflected from the first reflecting unit 2 is transmitted through the rear surface 32 of the lens 3 so that the optical loss which is generated by the beam reflected from the first reflecting unit 2 being reflected at the rear surface 32 may be decreased.

More preferably, the curvature of the rear surface 32 of the lens 3 may be a curvature that an incident angle to the rear surface 32 of the lens 3 of the beam reflected from the first reflecting unit 2 is 0 degrees. When the beam reflected from the first reflecting unit 2 is transmitted through the rear surface 32 of the lens 3, a refraction may not occur. Further, when the reflected beam occurred from the first reflecting unit 2 is transmitted through the rear surface 32 of the lens 3, the reflection occurs from the rear surface 32 of the lens 3 may be minimized. Even if the reflection occurs from at the rear surface 32 of the lens 3, the beam may be reflected again from the first reflecting unit 2 and thus may be not emitted toward the front side of the lens 3.

The lens 3 may include an optical axis X. The optical axis X of lens 3 may be a rotationally symmetric axis or a center axis and may refer to a straight line which passes through the center of the front surface 31 of the lens 3 and the center of the rear surface 32 of the lens 3.

The light source 10 may emit the beam in the direction parallel to the optical axis X of the lens 3.

The lighting device for a vehicle may further include a projection lens 5 which is disposed on the front surface of the lens 3 for condensing light which is emitted from the front surface 31 of the lens 3.

The projection lens 5 may have a greater size than the size of the lens 3.

The optical axis of the projection lens 5 can be matched with the optical axis X of the lens 3.

In order to improve the effect of condensing light, a plurality of projection lens 5 may be provided and the optical axes of the projection lens 5a and 5b may be matched with each other.

In order to condense the spreading out light, the diameter of a second projection lens 5b disposed away from the lens 3 may be greater than the diameter of a first projection lens 5a disposed adjacent to the lens 3.

The projection lens 5 may include a front surface 51, a rear surface 52, and a peripheral surface 53. The front surface 51 of the projection lens 5 may be a convex surface toward the front side. The rear surface 52 of the projection lens 5 may be a flat surface.

The reflective fluorescent body 4 may be disposed on the rear side of the lens 3 and allows light which has the converted wavelength of the beam reflected from the first reflecting unit 2 to be emitted to the lens 3.

The reflective fluorescent body 4 may be generated heat at the wavelength conversion of the light. Accordingly, the reflective fluorescent body 4 is preferably disposed to be spaced apart from the lens 3. The reflective fluorescent body 4 may be disposed on the rear side of the lens 3 to be spaced apart from the lens 3.

The reflective fluorescent body 4 may be disposed on the rear side of the lens 3.

The reflective fluorescent body 4 may be disposed to be faced the rear surface 32 of the lens 3 and may reflect light toward the rear surface 32 of the lens 3.

The reflective fluorescent body 4 may be disposed on the optical axis X of the lens 3 to be spaced apart from the rear surface 32 of the lens 3.

The reflective fluorescent body 4 may be capable of being eccentrically disposed with respect to the optical axis X of the lens 3 in addition to being disposed on the optical axis X of the lens 3.

However, in this case, the efficiency is low because an area through which light reflected from the reflective fluorescent body 4 is transmitted is smaller than the area in a case where the reflective fluorescent body 4 is disposed on the optical axis X. In other words, the reflective fluorescent body 4 is preferably disposed to the optical axis X of the lens 3.

In addition, assembly of the lens 3 may be improved at the time of the manufacturing of the lighting device for a vehicle by the reflective fluorescent body 4 being disposed on the optical axis X of the lens 3.

More specifically, if the reflective fluorescent body 4 is not disposed on the optical axis X of the lens 3, a correct relative position between the lens 3 and the reflective fluorescent body 4 is set so that the beam emitted from the light source 10 reach the reflective fluorescent body 4 and then the lens 3 and the reflective fluorescent body 4 have to be assembled to the correct relative position. In other words, the assembly of the lens may be difficult.

Contrary to this, in a case where the reflective fluorescent body 4 is disposed on the optical axis X of the lens 3, the optical axis X may be matched with the center axis of the lens 3. Therefore, in this case, it is required only that the reflective fluorescent body 4 is disposed on the center axis of the lens 3 for assembly of the lens. In other words, the assembly of the lens may be relatively easy.

The reflective fluorescent body may include a reflecting unit for reflecting light and a wavelength conversion layer which converts wavelength of light.

The wavelength conversion layer faces the rear surface 32 of the lens 3 and the reflective unit may be disposed on the rear side of the wavelength conversion layer.

The wavelength conversion layer may include a wavelength conversion film and may include an opto-ceramic. The wavelength conversion layer is capable to converting the wavelength of the beam reflected from the first reflecting unit 2 in a state of being positioned at the front side of the reflecting unit.

When the blue based beam is incident from the outside, the wavelength conversion layer may be a wavelength conversion film which converts the blue based light into the yellow based light. The wavelength conversion layer may include an opto-ceramic having yellow color.

The reflecting unit may include a plate and a reflecting coating layer which is coated the outside surface of the plate. The plate is made of a metal.

The reflecting unit may support the wavelength conversion layer and light transmitted through the wavelength conversion layer may be reflected toward the rear surface of the lens 3 by the reflecting unit.

When the blue based beam is reflected from the first reflecting unit 2 and then is incident on the reflective fluorescent body 4, a portion of the blue based beam is surface-reflected on the surface of the wavelength conversion layer and the blue based beam which is incident on the inside of the wavelength conversion layer may be oscillated while being scattered in the inside of the wavelength conversion layer.

The wavelength of a portion of the blue based light is converted into wavelength of the yellow based light and the wavelength of a portion of the blue based light may not be converted. The conversion rate may be changed according to the material of the fluorescent body, the rate containing YAG, or the like. The blue based light and the yellow based light in the inside of the wavelength conversion layer may be reflected to the front side of the wavelength conversion layer by the reflecting unit.

The blue based light which is surface-reflected at the surface of the wavelength conversion layer and the blue and the yellow based lights emitted to the front side of the wavelength of the wavelength conversion layer are mixed with each other and thus may become white based light. Accordingly, the white based light is emitted in the front surface of the reflective fluorescent body 4. This white based light may be transmitted through the lens 3 and may be emitted toward the front side of the lens 3.

The white based light emitted toward the front side in the reflective fluorescent body 4 radially spreads out toward the front side other than the laser beam having strong straightness. The lens 3 disposed on the front side of the reflective fluorescent body 4 and the projection lens 5 disposed on the front side of the lens 3 may perform a role condensing the white based light which is radiated.

The width in the longitudinal direction of the lighting device for a vehicle is determined by the distance L1 between the reflective fluorescent body 4 and lens 3.

The width in the longitudinal direction of the lighting device for a vehicle is lengthened and thus an optical efficiency thereof is reduced when the distance L1 between the reflective fluorescent body 4 and lens 3 is too long. The lens 3 may be damaged by heat of the reflective fluorescent body 4 when the distance L1 between the reflective fluorescent body 4 and the lens 3 is too short.

Accordingly, preferably, the reflective fluorescent body 4 is closely disposed to the lens 3, for example within a range in which the damage of the lens 3 by heat is minimized.

The heat radiating member 42 which assists to radiate heat of the reflective fluorescent body 4 may be disposed in the reflective fluorescent body 4. The heat radiating member 42 may include a contact plate 43 which is in contact with the reflective fluorescent body 4, and a heat radiating pin 44 which is projected from the contact plate 43.

In a case of a transmissive fluorescent body, the heat radiating member may be disposed on a side or a border of a transmissive fluorescent body, since a surface on which light is incident and the other surface from which light is emitted are different from each other. There may be a problem in which the heat radiation is not efficiently performed since the contact area between the heat radiating member and the transmissive fluorescent body is narrow.

The contact plate 43 may be attached to the rear surface of the reflective unit to be surface-contacted since the surface on which light is incident and the surface from which is emitted are entirely the same in the reflective fluorescent body 4 according the present implementation. The heat radiation is effectively performed since a contact area between contact plate 43 and the reflective fluorescent body 4 become wide.

Meanwhile, the first reflecting unit 2 may be provided to reflect the incident beam to the reflective fluorescent body 4.

The first reflecting unit 2 be capable of being provided to lens 3 to be integrated with the lens 3 or be capable of being provided separately from the lens 3 spaced apart from the lens 3.

The first reflecting unit 2 may be determined the position thereof according to an arrangement position of the reflective fluorescent body 4. In a case where the reflective fluorescent body 4 is disposed on the rear side of the lens 3, the first reflecting unit 2 is positioned on the rear side of the lens 3 to be spaced apart from the lens 3, is provided on the rear surface of the lens 3, or is positioned on the front side of the lens 3 to be spaced apart from the lens 3.

The first reflecting unit 2 allows the beam emitted from the light source 10 to be reflected to the reflective fluorescent body 4, in a state where the first reflecting unit 2 is provided on the rear side of the lens 3 to be spaced apart from the lens 3.

The first reflecting unit 2 allows the beam emitted from the light source 10 to be reflected to the reflective fluorescent body 4, in a state where the first reflecting unit 2 is provided on the rear surface 32 of the lens 3 to be integrated with the lens 3.

The first reflecting unit 2 allows the beam transmitted through the lens 3 after being emitted from light source 10 to be reflected to the lens 3 to be incident on the reflective fluorescent body 4, in a state where the first reflecting unit 2 is provided on the front surface 31 of the lens 3 to be integrated with the lens 3.

The first reflecting unit 2 allows the beam transmitted through the lens 3 after being emitted from light source 10 to reflect to the lens 3 to be incident on the reflective fluorescent body 4, in a state where the first reflecting unit 2 is provided on the front side of the lens 3 to be spaced apart from the lens 3.

In a case where the first reflecting unit 2 is provided the rear side or the front side of the lens 3 to be spaced apart from lens 3, the component number of the lighting device for a vehicle may be increased and the size of the lighting device for a vehicle is increased by the separation distance between the lens 3 and the first reflecting unit 2 from each other.

Preferably, the first reflecting unit 2 is provided in the front surface 31 or the rear surface 32 of the lens 3 so as to integrate the first reflecting unit 2 and the lens 3, thereby minimizing the component number of the lighting device for a vehicle and forming a compact lighting device for a vehicle.

In a case where the first reflecting unit 2 is provided on the entire rear surface 32 of the lens 3 or the entire front surface 31 of the lens 3, the light of which wavelength is converted and which is reflected in the reflective fluorescent body 4 is all reflected to the rear side of the lens 3. Accordingly, light is not emitted to the front side of the lens 3 since the wavelength of the light is converted in the reflective fluorescent body 4.

In other words, preferably, the first reflecting unit 2 is provided on a portion of the rear surface 32 of the lens 3 or a portion of the front surface 31 of the lens 3. Preferably, the first reflecting unit 2 has a size that the lens 3 is capable of securing a sufficient portion of the light emitting area.

Preferably, the first reflecting unit 2 is disposed so as not to intersect the optical axis X of the lens 3. Preferably, the first reflecting unit 2 is disposed between the optical axis X of the lens 3 and the perimeter surface 33 of the lens 3.

The first reflecting unit 2 may be provided on a portion area of the rear surface 32 of the lens 3 or a portion area of the front surface 31 of the lens 3. The first reflecting unit 2 may be provided to reflect the beam emitted from the light source 10 to the reflective fluorescent body 4.

The first reflecting unit 2 may reflect the incident light to the rear side of the lens 3.

Preferably, the arrangement position of the first reflecting unit 2 is determined considering on the position relationship between the reflective fluorescent body 4 and the lens 3 and the curvature of a portion area of the front surface 31 or the rear surface 32 of the lens 3.

In the present implementation, the first reflecting unit 2 may be attached to the front surface 31 of the lens 3. The beam emitted from the light source 10 transmits through the rear surface 32 of the lens 3 and then reaches the first reflecting unit 2 and the beam reflected from the first reflecting unit 2 transmits through the rear surface 32 of the lens 3 again and then is incident on the reflective fluorescent body 4.

The optical efficiency may be increased since the incident angle to the reflective fluorescent body 4 of the beam is reduced in a case where the first reflecting unit 2 is attached to the front surface 31 of the lens 3 than in a case where the first reflecting unit 2 is attached to the rear surface 32 of the lens 3.

The wider light emitting area may be secured in a case where the first reflecting unit 2 is attached to the front surface 31 of the lens 3 than in a case where the first reflecting unit 2 is attached to the rear surface 32 of the lens 3 when the first reflecting units 2 have the same sizes with each other at the two cases described above.

In other words, the first reflecting unit 2 may be provided in a partial area of the front surface 31 of the lens 3. The beam emitted from the light source 10 transmits through the lens 3 and then may be incident on the first reflecting unit 2. The beam reflected from the first reflecting unit 2 transmits through the lens 3 and then is incident on the reflective fluorescent body 4. The light of which the wavelength is converted by the reflective fluorescent body 4 transmits through the lens 3 and then may be irradiated to the front side of the lens 3.

In a case where the first reflecting unit 2 is attached to the front surface 31 of the lens 3, the light is transmitted through the lens three times. More specifically, the beam emitted from the light source 10 transmits through the lens 3 and then is incident on the first reflecting unit 2. The beam reflected from the first reflecting unit 2 transmits through the lens 3 and then is incident on the reflective fluorescent body 4. The light of which wavelength is converted and reflected from the reflective fluorescent body 4 transmits through the lens 3 and then emitted to the front side of the lens 3.

Accordingly, the lens 3 may be a three-path lens through which light transmits three times. The lighting device for a vehicle is capable of being made to be compact by these three-path lens.

In a case where the lens 3 is the three-path lens, the beam is not emitted to the front side of the lens 3 before the beam emitted from the light source 10 reaches the reflective fluorescent body 4. Accordingly, all the optical devices except for the first reflecting unit 2, for example, the lighting device 1, and the reflective fluorescent body 4 may be provided at the rear side of the lens 3.

More specifically, an additional optical component for being incident light on the reflective fluorescent body 4 may is not disposed on the front side which is spaced apart from the lens 3. Accordingly, arrangement of the optical components is easy.

In other words, the manufacturing of the lighting device for a vehicle become easy, the replacement or the design change of the lighting device 1 to the reflective fluorescent body 4 also becomes easy, and a provision of an additional optical device such as the reflecting member to the lighting device 1 becomes easy.

In addition, the lens 3 and the projection lens 5 may be disposed so that the distance between the lens 3 and the projection lens 5 is reduced, since an additional optical component that allows light to be incident on the reflective fluorescent body 4 in the front side spaced apart from the lens 3. Accordingly, the optical efficiency and the light collecting effect of the projection lens 5 may be increased.

The first reflecting unit 2 is formed according to a front surface 31, which may be concave, in a portion of a front surface 31 of the lens 3 and the cross sectional shape of the first reflecting unit 2 may be formed as an arc-shape. The first reflecting unit 2 may be a round shape or a polygonal shape when viewing from the front side of the lens 3.

The first reflecting unit 2 may be a concave mirror formed on the front surface 31 of the lens 3. The first reflecting unit 2 may have a convex front surface and a concave rear surface.

The front surface of the first reflecting unit 2 may faces the projection lens 5. The first reflecting unit 2 may be projected by the lens 3 and the projection lens 5 between the lens 3 and the projection lens 5.

The first reflecting unit 2 may be a coating layer coated at the position other than the optical axis X of the lens 3 of the front surface 31 of the lens 3.

The first reflecting unit 2 may be a reflective sheet attached at the position other than the optical axis X of the lens 3 of the front surface 31 of the lens 3.

The first reflecting unit 2 may be disposed so as not to be linearly aligned with the light source 10 and the reflective fluorescent body 4. In some implementations, the first reflecting unit 2 may be disposed so as not to intersect with an extension line W connecting the light source 10 and the reflective fluorescent body 4. As such, the beam emitted toward the first reflective unit 2 from the light source 10 reaches the first reflective unit 2 without being blocked by the rear surface of the reflective fluorescent body 4.

Preferably, the reflective fluorescent body 4 is disposed on the optical axis X of the lens 3, the light source 10 is disposed so as not to intersect with the optical axis X of the lens 3. The light source 10 may emit a light beam in a direction parallel to the optical axis X of the lens 3. Further, the first reflecting unit 2 is disposed so as not to intersect with the optical axis X of the lens 3 so that the beam emitted from the light source 10 reaches the first reflecting unit 2.

Further, the lighting device for a vehicle may further include a lens holder 58 which supports the lens 3 and the projection lens 5.

Hereinafter, as an example, it is described that the light source 10 emits the blue based beam and the reflective fluorescent body 4 converts the wavelength of the blue based light into the wavelength of the yellow based light.

With reference to FIG. 2, an operation of the present implementation will be described as follow:

First, when the light source 10 turns on, the blue based beam A may be emitted from the light source 10 and the beam may be incident on the rear surface 32 of the lens 3 parallel to the optical axis X of the lens 3.

The beam B which is incident on the rear surface 32 of the lens 3 transmits through the lens 3 and may be incident on the first reflecting unit 2, and then may be reflected from the first reflecting unit 2 to the lens 3.

The beam C reflected from the first reflecting unit 2 may be reflected in the direction toward the optical axis X of the lens 3 by the first reflecting unit 2 and may transmit through the rear surface 32 of the lens 3 and then may be refracted.

The beam D transmitted through the rear surface of the lens 3 may be incident on the reflective fluorescent body 4.

The wavelength of the beam which is incident on the reflective fluorescent body 4 may be converted by the reflective fluorescent body 4 and the white based light E may be reflected to the rear surface 32 of the lens 3 and may be collected while being transmitted through the lens 3 in the reflective fluorescent body 4. The white based light E may transmit through the front surface 31 of the lens 3 and then may be incident on the projection lens 5 through the rear surface 52 of the projection lens 5, may be collected at the projection lens 5 and then may be emitted parallel and thus this light F may be irradiated to the front side of a vehicle.

Figure 4:
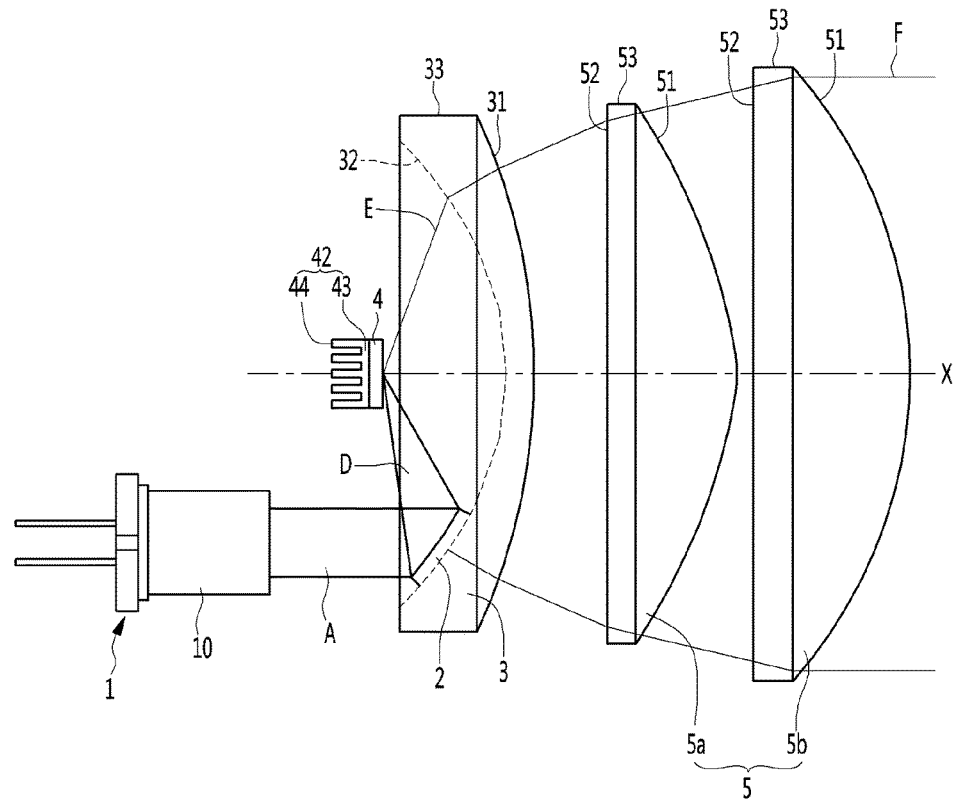
FIG. 4 is a diagram illustrating an example of a lighting device for a vehicle according to a second implementation.

FIG. 4 is a construction view illustrating a lighting device for a vehicle according to a second implementation.

Hereinafter, detailed description of the same or similar constructions as the construction described above will be incorporated from the above descriptions. Accordingly, only different constructions from the construction described above will be expressly described below.

According to the second implementation, the lens 3 may be a meniscus lens. In this scenario, the first reflecting unit 2 may be attached on the rear surface 32 of the lens 3, as shown in the example of FIG. 4.

When the rear surface 32 of the lens 3 has a spherical surface, since a focus on which the reflected beam from the spherical surface is collected becomes a center of the spherical surface, the reflective fluorescent body 4 may be disposed on the center of the spherical surface on which the beam reflected from the first reflecting unit attached on the rear surface 32 is collected. In this case, the distance L1 between the lens 3 and the reflective fluorescent body 4 is increased and thus the optical efficiency may deteriorate. Accordingly, preferably, the rear surface of the lens 3 may be a spherical surface or an aspheric surface.

With reference to FIG. 4, an example operation of the second implementation having the configuration as above will be described as follows:

First, when the light source 10 turns on, the blue based beam A may be emitted from the light source 10 and the beam may be incident on the first reflecting unit 2 parallel to the optical axis X of the lens 3.

The beam A which is emitted from the light source 10 does not transmit through the lens 3 and instead is immediately incident on the first reflecting unit 2, and is then reflected from the first reflecting unit 2 toward the reflective fluorescent body 4.

The beam D reflected from the first reflecting unit 2 may be reflected in the direction toward the optical axis X of the lens 3 by the first reflecting unit 2 and thus may be incident on the reflective fluorescent body 4.

The wavelength of the beam which is incident on the reflective fluorescent body 4 may be converted by the reflective fluorescent body 4. For example, after wavelength conversion a white based light E may be reflected from reflective fluorescent body 4 to the rear surface 32 of the lens 3. The white based light may be condensed while being transmitted through the lens 3.

The white based light E may transmit through the front surface 31 of the lens 3 and then may be incident on the projection lens 5 through the rear surface 52 of the projection lens 5. The white based light E may then be condensed at the projection lens 5 and emitted as light F in parallel with the axis X. This light F may be irradiated to the front side of a vehicle.

Implementations described herein may help reduce optical loss due caused by reflection generated at the rear surface 32 of the lens 3. For example, by configuring the beam emitted from the light source 10 to not transmit through the lens 3 and instead to reach the reflective fluorescent body 4, optical loss due to reflection generated at the rear surface 32 of lens 3 may be avoided.

Figure 5:
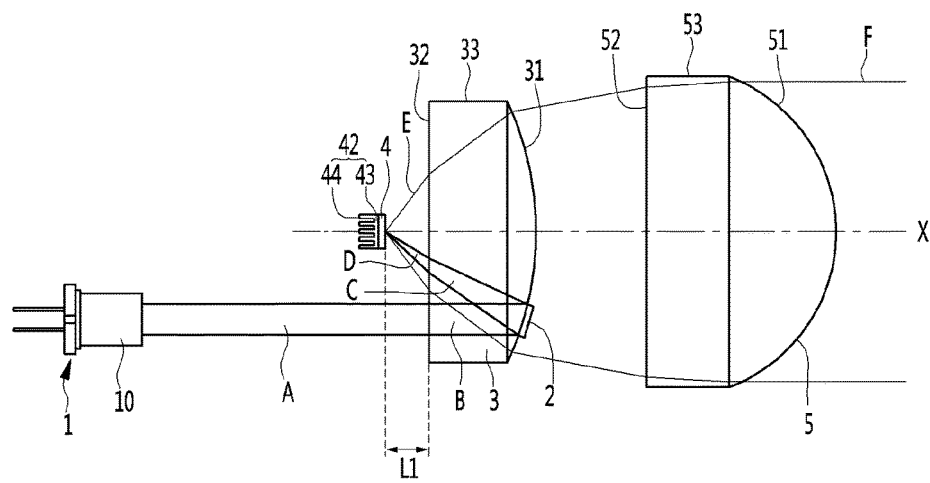
FIG. 5 is a diagram illustrating an example of a lighting device for a vehicle according to a third implementation.

FIG. 5 is a construction view illustrating a lighting device for a vehicle according to a third implementation.

Hereinafter, detailed descriptions regarding the same or similar constructions as in the construction described above will be incorporated from the descriptions above. Accordingly, only different constructions from the construction above will be newly described below.

In the present implementation, the front surface 31 of the lens 3 may have a convex curved surface toward the front side and the rear surface 32 of the lens 3 may have a flat surface. The first reflecting unit 2 may be provided on the front surface 31 of the lens 3. If the first reflecting unit 2 is provided on the rear surface 32 of the lens 3 which is a flat surface, the beam which is incident on the first reflecting unit 2 is not condensed.

In a case where the rear surface 32 of the lens 3 is flat surface, since the inside of the rear surface 32 of the lens 3 is not empty unlike the meniscus lens, the optical loss which is generated at the air layer is reduced and thus the optical power may be relatively high. Accordingly, only one projection lens 5 may be provided.

In a case where the rear surface 32 of the lens 3 may be a flat surface, the processability thereof is excellent, manufacturing thereof is easy and cost thereof may be reduced. Further, compared to the meniscus lens, the size of the lens 3 is decreased and the number of the projection lens 5 is decreased, resulting in a more compact lighting device for a vehicle.

The effect according to the construction of the present implementation is the same as or similar to the first implementation.

Figure 6:
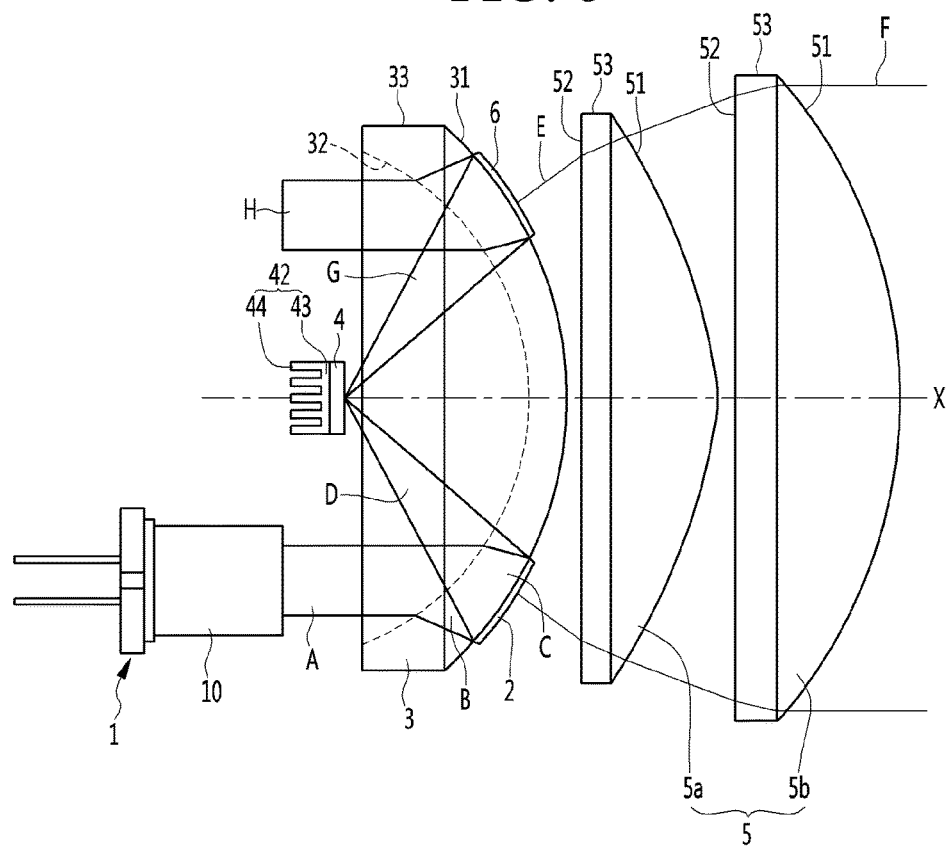
FIG. 6 is a diagram illustrating an example of an optical path of a lighting device for a vehicle according to a fourth implementation.

FIG. 6 is a construction view illustrating a lighting device for a vehicle according to a fourth implementation.

The lighting device may include a second reflecting unit 6 which reflects, to the rear side of the lens 3, a portion of the beam that is reflected from the reflective fluorescent body 4 to the lens 3. Since the other constructions and the effects other than the second reflecting unit 6 are the same or similar to the first, second, and third implementations, constructions other than the second reflecting unit 6 will be referred to using the same numerical references as the first, second, and third implementations.

In some implementations, the second reflecting unit 6 may be connected with the first reflecting unit 2 and thus may constitute a single reflecting unit. However, preferably, the second reflecting unit 6 may be spaced apart from the first reflecting unit 2 in the front surface 31 or the rear surface 32 of the lens 3. The second reflecting unit 6 being spaced apart from the first reflecting unit 2 may help more fully secure a light emitting area of the lens 3.

The light source 10 may be a laser diode and a blue based laser beam having a high efficiency may be irradiated. However, the emission of such a blue based laser beam from the vehicle creates a risk that the blue based laser beam may damage the eye or eyesight of persons outside the vehicle. In some implementations, the lighting device may implement a fluorescent body configured to convert a wavelength of the blue laser light into a white color light.

However, in some scenarios, a light leakage phenomenon may occur whereby some of the blue laser light is not converted into white color light at the fluorescent body, and instead emitted to the front side of the lighting device for a vehicle. This light leakage phenomenon may still create the risk that the emitted blue based laser beam may damage the eye or eyesight of a person.

In order to prevent the light leakage phenomenon, the second reflecting unit 6 is configured to reflect, to the rear side of the lens 3, the blue based beam which is surface-reflected without undergoing the wavelength converting at the reflective fluorescent body 4.

However, in some scenarios, the second reflecting unit 6 may, in addition to reflecting the blue based beam of which the wavelength is not converted, also reflect the white based light of which the wavelength is converted. In such scenarios, when the white based light is reflected to the rear side of the lens 3 by the second reflecting unit 6, the optical efficiency of the lighting device may be reduced.

Accordingly, preferably, the second reflecting unit 6 has a size and a position that sufficiently secures the optical emitting area of the lens 3 and is configured to reflect the blue based beam surface reflected from the reflective fluorescent body 4 to the rear side of the lens 3 as much as possible.

The first reflecting unit 2 and the second reflecting unit 6 may be provided on the front surface 31 of the lens 3 as illustrated in the FIG. 6, respectively, or may be provided on the rear surface 32 of the lens 3.

The first reflecting unit 2 and the second reflecting unit 6 may have an arc shape as a cross-sectional shape on the front surface 31, which may be convex, of the lens 3, respectively.

The first reflecting unit 2 and the second reflecting unit 6 may have a concave mirror formed along the front surface 31 of the lens 3 on the front surface 31, which may be convex, of the lens 3, respectively.

The first reflecting unit 2 and the second reflecting unit 6 may be provided to be spaced apart with each other. The first reflecting unit 2 and the second reflecting unit 6 may be provided symmetrically relative to the optical axis X of the lens 3.

The first reflecting unit 2 and the second reflecting unit 6 may be provided symmetrically to be a 180° phase difference to the front surface 31 of the lens 3.

In a case where the first reflecting unit 2 may be provided on the left area of the front surface 31 of the lens 3, the second reflecting unit 6 may be provided on the right area of the front surface 31 of the lens 3.

In a case where the first reflecting unit 2 may be provided on the upper side area of the front surface 31 of the lens 3, the second reflecting unit 6 may be provided on the lower side area of the front surface 31 of the lens 3.

The first reflecting unit 2 and the second reflecting unit 6 may be provided at the same distance from the optical axis X of the lens with each other or at the different distance from the optical axis X of the lens with each other.

At the surface of the lens 3, the curvature of a portion thereof to which the first reflecting unit 2 and the second reflecting unit 6 is attached may be the same with each other.

The first reflecting unit 2 and the second reflecting unit 6 is made of a reflective coating layer coated on the portion other than the optical axis X of the lens 3 of the front surface of the lens 3 or is made of a reflective seat attached to the portion other than the optical axis X of the lens 3 of the front surface of the lens 3, respectively.

The first reflecting unit 2 provided on the front surface 31 of the lens 3 may reflect the beam which is emitted from the light source 10 and then is transmitted through the lens 3 to the reflective fluorescent body 4. The light which is reflected from the reflective fluorescent body 4 may be transmitted through the lens 3. A portion of light which is reflected from the reflective fluorescent body 4 to the lens 3 may be incident on the second reflecting unit 6.

The light reflected from the reflective fluorescent body 4 to the second reflecting unit 6 may be again reflected in the rear side direction of the lens 3 by the second reflecting unit 6. The light G which is reflected in the rear side direction of the lens 3 by the second reflecting unit 6 is transmitted through the rear surface 32 of the lens and may be refracted. The light H which is reflected from the second reflecting unit 6 and then is transmitted through the rear surface of the lens 3 may be irradiated into the rear side of the lens 3.

The second reflecting unit 6 may be configured to reduce the light leak phenomenon by reducing the transmission, through an area on which the second reflecting unit 6 of the lens 3 is formed, of the beam which is surface-reflected without wavelength conversion in the reflective fluorescent body 4. Instead, such a non-wavelength-converted beam may be reflected by second reflecting unit 6 to the rear side of the lens 3.

Figure 7:
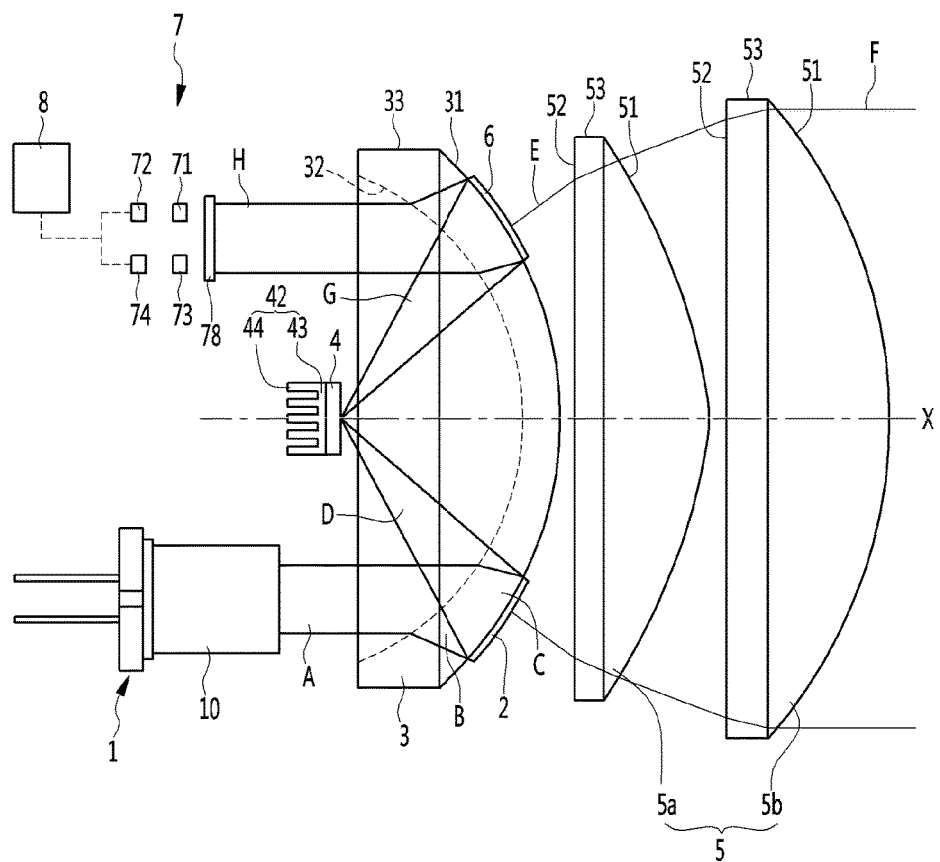
FIG. 7 is a diagram illustrating an example of an optical path of a lighting device for a vehicle according to a fifth implementation.

FIG. 7 is a construction view illustrating an optical path of the lighting device for a vehicle according to a fifth implementation.

The present implementation may include a detecting unit 7 which detects light H reflected to the rear side of the lens 3 from the second reflecting unit 6, and a control unit 8 which controls the light source 10 according to the detection value of the detecting unit 7. Since the other constructions and the effects thereof other than the detecting unit 7 and the control unit 8 are the same or similar to the fourth implementation, constructions other than the detecting unit 7 and the control unit 8 are referred to using the same numerical references as the first to third implementations.

The detecting unit 7 may be disposed on the rear side of the lens 3.

The detecting unit 7 is disposed outside of the optical axis X of the lens 3.

The detecting unit 7 may be disposed on the rear side of the area on which the second reflecting unit 6 of the lens 3 is attached.

The detecting unit 7 may include a first filter 71 through which a blue light is transmitted, a first optical sensor 72 which detects light which transmits through the first filter 71, a second filter 73 which blocks the blue light, and a second optical sensor 74 which detects light which transmits through the second filter 73.

Preferably, the detecting unit 7 may further include a third filter 78 which is disposed on the front side of the first filter 71 and the second filter 73 and thus detects light which is towards the first filter 71 and the second filter 73.

The control unit 8 may allow the light source 10 to be turned off when the control unit 8 detects light which is more than the reference value in the first optical sensor 72. The control unit 8 may allow the light source 10 to be turned off when the control unit 8 detects light which is equal to and less than the reference value or does not detect light at the second optical sensor 74.

When the light which is more than the reference value is detected at the first optical sensor 72, it may be meant that the reflective fluorescent body 4 cannot convert the blue based light into the white based light. In this case, the light source 10 may be turned off in order not to emit the blue based light in the front side of the vehicle.

Further, when the light which is less than the reference value is detected or does not detect light at the second optical sensor 74, it may be meant that the reflective fluorescent body 4 cannot normally functioned. In this case, the light source 10 may be turned off in order not to emit the blue based light in the front side of the vehicle.

Although implementations have been described with reference to a number of illustrative implementations thereof, it should be understood that numerous other modifications and implementations can be devised by those skilled in the art that will fall within the spirit and scope of the principles of this disclosure.

Accordingly, implementations described in the present disclosure are for illustrating but not for limiting the technical scope of the present invention.

In addition, the protective scope of the present invention should be construed by the following claims, and all technical spirits within a scope equivalent to the protective scope will be construed as being included in the scope of the invention.

What is claimed is:

1. A lighting device for a vehicle, comprising:
    a light source;
    a first reflecting unit configured to reflect a beam emitted from the light source;
    a lens in which the first reflecting unit is provided on a partial area of a surface of the lens;
    a reflective fluorescent body configured to:
        convert a wavelength of light reflected from the first reflecting unit; and
        reflect, into the lens, the wavelength-converted light, and
    a second reflecting unit provided on the surface of the lens and configured to reflect, to a rear side of the lens, light that is reflected from the reflective fluorescent body,
    wherein the reflective fluorescent body is disposed on a rear side of the lens and faces a rear surface of the lens,
    wherein the first reflecting unit is disposed so as not to be linearly aligned with the light source and the reflective fluorescent body, and
    wherein the rear surface of the lens has a concave shape and a front surface of the lens has a convex shape.

2. The lighting device for a vehicle according to claim 1, wherein the rear surface of the lens is an aspheric surface.

3. The lighting device for a vehicle according to claim 2, wherein the first reflecting unit is provided on the rear surface of the lens.

4. The lighting device for a vehicle according to claim 1, wherein the first reflecting unit is provided on the front surface of the lens.

5. The lighting device for a vehicle according to claim 1, wherein the rear surface of the lens is a spherical surface.

6. The lighting device for a vehicle according to claim 1, wherein a curvature of the rear surface of the lens is less than a curvature of the front surface of the lens.

7. The lighting device for a vehicle according to claim 1, wherein a curvature of the rear surface of the lens is a curvature through which the light reflected from the first reflecting unit is transmitted.

8. The lighting device for a vehicle according to claim 1, wherein a cross sectional shape of the first reflecting unit is an arc shape.

9. The lighting device for a vehicle according to claim 1, wherein the first reflecting unit is a concave mirror which is formed on the surface of the lens.

10. The lighting device for a vehicle according to claim 1, wherein the light source is configured to emit the light beam in a direction parallel to an optical axis of the lens.

11. The lighting device for a vehicle according to claim 1, wherein the reflective fluorescent body is disposed on an optical axis of the lens.

12. The lighting device for a vehicle according to claim 1, wherein the light source is disposed so as not to intersect with an optical axis of the lens.

13. The lighting device for a vehicle according to claim 1, wherein the reflective fluorescent body comprises:
    a reflecting unit configured to reflect light; and
    a wavelength conversion layer configured to convert a wavelength of light.

14. The lighting device for a vehicle according to claim 13, wherein the reflective fluorescent body further comprises a heat radiating member configured to dissipate heat.

15. The lighting device for a vehicle according to claim 1, further comprising:
    at least one projection lens disposed on a front side of the lens and configured to condense the light emitted from a front surface of the lens.

16. The lighting device for a vehicle according to claim 15, wherein an optical axis of the at least one projection lens matches the optical axis of the lens.

17. The lighting device for a vehicle according to claim 1, wherein the first reflecting unit being disposed so as not to be linearly aligned with the light source and the reflective fluorescent body comprises:
    the first reflecting unit being disposed so as not to intersect with an extension line connecting the light source and the reflective fluorescent body.

18. The lighting device for a vehicle according to claim 1, wherein the first reflecting unit being disposed so as not to be linearly aligned with the light source and the reflective fluorescent body comprises:
    the first reflecting unit being disposed such that the beam emitted from the light source reaches the first reflective unit without being blocked by the reflective fluorescent body.

* * * * *